(No Model.)

J. B. CLEAVELAND.
WIRE STRETCHER.

No. 375,127. Patented Dec. 20, 1887.

Witnesses
H. P. Hood.
V. M. Hood.

Inventor
John B. Cleaveland

UNITED STATES PATENT OFFICE.

JOHN B. CLEAVELAND, OF INDIANAPOLIS, INDIANA.

WIRE-STRETCHER.

SPECIFICATION forming part of Letters Patent No. 375,127, dated December 20, 1887.

Application filed June 21, 1887. Serial No. 241,974. (No model.)

*To all whom it may concern:*

Be it known that I, JOHN B. CLEAVELAND, a citizen of the United States, residing at Indianapolis, in the county of Marion and State of Indiana, have invented a new and useful Improvement in Wire-Stretchers, of which the following is a specification.

My invention relates to an improvement in a wire stretcher for which Patent No. 338,486 was issued to me March 23, 1886.

The object of my present improvement is to provide a wire-stretcher of the same class which will be cheaper and more convenient to manufacture, and in which the bracket in which the windlass turns and by which it is secured to the post shall also take the place of the elastic washer, all as hereinafter fully described.

The accompanying drawings illustrate my invention.

Figure 1:
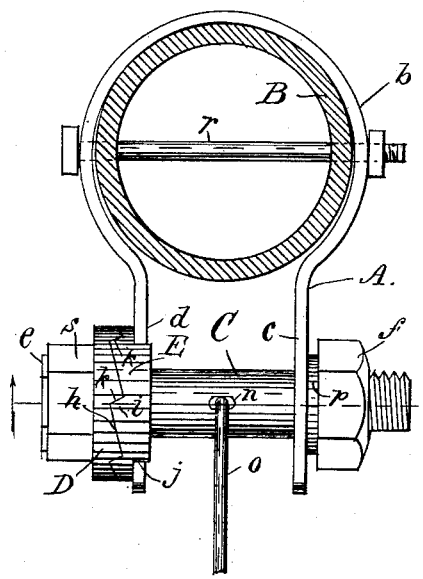
Figure 3:
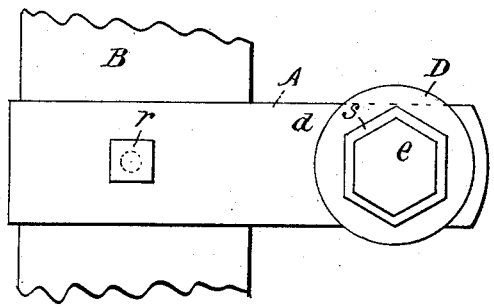
Figure 2:
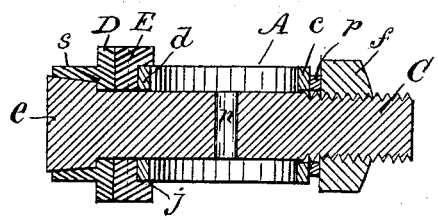
Figure 4:
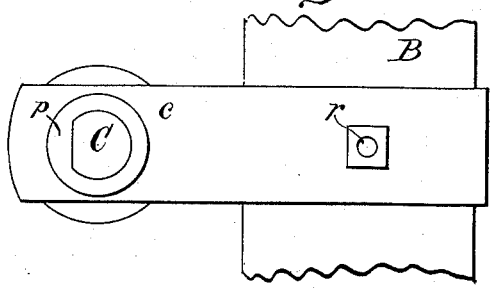

Figure 1 is a plan. Fig. 2 is a vertical section at $a$. Fig. 3 is a side elevation. Fig. 4 is an elevation of the side opposite Fig. 3, the nut being omitted.

A is a bracket formed of a continuous strip of metal having resilient qualities, as hard wrought-iron or steel, and bent to form a loop, $b$, adapted to loosely embrace the cylindrical post B, and two arms, $c$ and $d$, in which are formed bearings for the spindle C. Spindle C consists of an ordinary bolt having an angular head, $e$, and threaded at the opposite end to receive the nut $f$. The spindle is perforated at $n$ to receive the end of the fence-wire $o$.

D is a washer having its inner face provided with teeth $h$, and having on its outer face a socket, $s$, adapted to receive and fit the angular head of the spindle C, the purpose being to cause the washer to turn with the spindle.

E is a circular plate having a central hole through which the spindle may pass, and provided on its outer face with ratchet-teeth $i$, corresponding to the teeth $h$ on washer D. The opposite side of plate E is provided with a recess, $j$, into which the arm $d$ of bracket A fits, the purpose being to hold the plate in a fixed relation to the arm. The ratchet-teeth $h$ and $i$ have backwardly-inclined retaining-faces $k$ $k$, for the purpose of allowing the spindle to turn backward under a heavy strain.

For the purpose of preventing nut $f$ from being turned on the spindle by friction against arm $c$ when the spindle is turned, one side of the threaded portion of the spindle is filed off flat, and a washer, $p$, having a central hole adapted to fit over the flattened portion of the spindle, is interposed between the nut and the arm.

Bracket A is secured to the post by a light bolt, $r$, passing through the post and loop $b$.

In operation, the bracket having been secured to a fence-post, the end of wire $o$, previously secured at the opposite end to a fixed support, is secured to the spindle by passing it through the hole $n$. Nut $f$ is now turned up so as to force arms $c$ and $d$ of the bracket toward each other, loop $b$ at the same time yielding slightly. The recoil of the loop and the arms operates to force the plate E and washer D together, thus holding the ratchet-teeth thereon in engagement. The wire $o$ is now wound upon the spindle until sufficiently taut, the spindle being turned in the direction indicated by the arrow and the spindle being prevented from turning backward by the ratchet-teeth until some extra strain is brought upon the wire, as the contraction of the wire in cold weather, when the strain against the backwardly-inclined faces $k$ of the ratchet-teeth will operate to force arm $d$ toward arm $c$, and thus allow the spindle to turn backward until the extra strain is relieved, and thus avoid the breaking of the wire or undue strain upon the posts.

The amount of the resilient tension of the bracket may be nicely regulated by turning nut $f$, and the point at which the spindle will yield to the strain of the wire be thereby easily adjusted.

The general operation of this wire-stretcher is the same as that shown in my above-mentioned patent; but in this the resilient bracket takes the place of the "spring-washer" of the former device, and the means adopted in this for securing the "ratchet-collar" or washer to the spindle saves machine-work and is more reliable, and the tension by means of which the ratchet-teeth are held in engagement is more easily and perfectly regulated.

I claim as my invention—

1. The above-described wire-stretcher, consisting of a resilient bracket having a pair of projecting arms and a loop adapted to embrace a post, a spindle having an angular head and a screw-threaded portion and arranged to revolve in said arms, a nut secured on said threaded portion of the spindle, a ratchet-faced plate secured to the outside of one of said arms, and a corresponding ratchet-faced washer arranged to engage the ratchet-faced plate and having on its opposite side a socket adapted to receive and fit the angular head of the spindle, all combined and arranged to co-operate substantially as and for the purpose specified.

2. The above-described wire stretcher, consisting of the bracket formed of a single piece of resilient metal bent to form a loop adapted to embrace a post, and also a pair of projecting arms, the spindle having an angular head and a screw-threaded portion and arranged to revolve in said arms, the nut secured on the spindle, the plate secured to one arm of the bracket and having ratchet-teeth whose retaining-faces are inclined backward, and the washer having ratchet-teeth corresponding to those of said plate and arranged to engage therewith, and having also on its opposite face a socket adapted to receive and fit the angular head of the spindle, all combined and arranged to co-operate substantially as and for the purpose specified.

3. In a wire stretcher of the class described, the combination, with a bracket adapted to be secured to a post, a ratchet-faced plate secured to said bracket, and a spindle having an angular head and arranged to pass through said plate and to revolve in said bracket, of a washer mounted on said spindle and having on one side ratchet-teeth corresponding to the ratchet face of the plate and having on the opposite side a socket adapted to receive and fit the angular head of the spindle, so as to turn therewith, a nut on the spindle, and a spring arranged to hold the ratchets of said plate and washer in engagement, all substantially as and for the purpose specified.

JOHN B. CLEAVELAND.

Witnesses:
H. P. HOOD,
V. M. HOOD.